United States Patent [19]

Jud et al.

[11] Patent Number: 5,030,302
[45] Date of Patent: Jul. 9, 1991

[54] METHOD FOR MAKING A COMPOUND FOIL

[75] Inventors: Wilfried Jud, Obergrafendorf, Austria; Wilhelm Mannertorp, Saltsjoe-Boo, Sweden; Franz Reiterer, Innermanzing; Alfred Gnadenberger, Obergrafendorf, both of Austria

[73] Assignee: Teich AG, Obergrafendor-Muhlhofen, Austria

[21] Appl. No.: 413,446

[22] Filed: Sep. 27, 1989

Related U.S. Application Data

[63] Continuation of Ser. No. 143,161, Jan. 21, 1988, abandoned.

[30] Foreign Application Priority Data

Apr. 24, 1986 [AT] Austria .................................. 1095/86

[51] Int. Cl.$^5$ ................................................ B32B 31/08
[52] U.S. Cl. ...................................... 156/164; 156/163; 156/183; 156/229; 156/291; 156/324; 428/194; 428/198
[58] Field of Search ................ 156/164, 291, 163, 324, 156/183, 229; 428/198, 192, 194; 493/264; 229/87.01, 87.03, 87.07

[56] References Cited

U.S. PATENT DOCUMENTS

| | | | |
|---|---|---|---|
| 1,445,070 | 2/1923 | Clune ................................. | 428/198 |
| 2,022,852 | 12/1935 | Galligan et al. ................. | 156/183 X |
| 2,314,876 | 3/1943 | Greene ............................ | 156/291 X |
| 2,518,762 | 8/1950 | Draheim ......................... | 428/198 X |
| 2,952,397 | 9/1960 | Doyle .............................. | 428/198 X |
| 3,342,613 | 9/1967 | Schelhorn ....................... | 156/291 |
| 3,505,083 | 4/1970 | Schelhorn ....................... | 428/198 X |
| 4,460,426 | 7/1984 | Saito ................................ | 156/291 X |

Primary Examiner—Caleb Weston
Assistant Examiner—Jeff H. Aftergut
Attorney, Agent, or Firm—Bierman and Muserlian

[57] ABSTRACT

Method for the production of a compound foil as an endless strip, the compound foil to be processed in the form of rectangular blanks covering a width of the endless strip characterized in that two different foil strips, of which a first strip contains an aluminum foil (4) or a paper are drawn through a lamination machine with tractive forces to overcome friction losses in the machine, these tractive forces producing different elongations in said two different foil strips, that one of the endless strips is provided at one side surface with a binding agent over a connecting surface, which consists of several partial areas (3, 13) separated from each other, that the two strips are connected to each other while the both strips being elastically stretched to different elongations as the strips are drawn through the lamination machine whereby after the two foil strips coming back again to their non-stretched starting state, that surfaces of the blanks each have one central area and two margin areas (9, 12) bordering on two blanks surface margins extending both in the endless strip extension, with, in each instance, in those margin areas (9, 12) a first proportion defined by the connecting surface area divided by the margin area surface being significantly greater than a second proportion defined by the connecting surface at the central area divided by the central area surface and that in the margin areas (9, 12) of the blank surface the said first proportion is at most 75%.

10 Claims, 2 Drawing Sheets

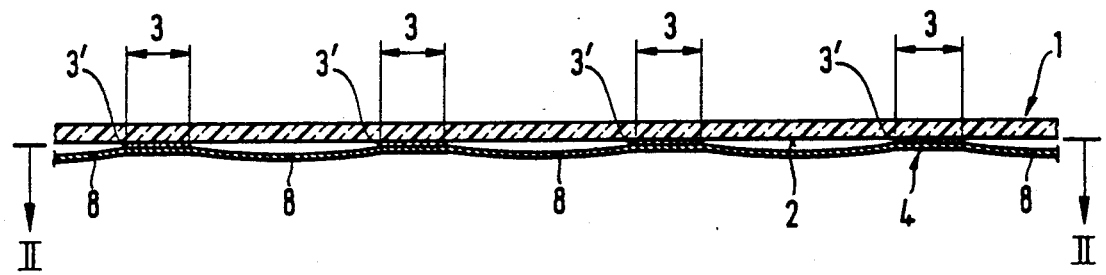
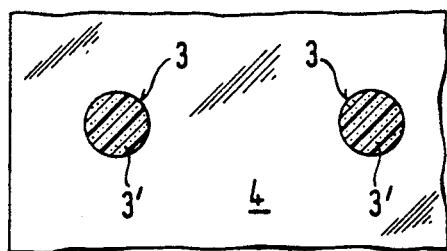
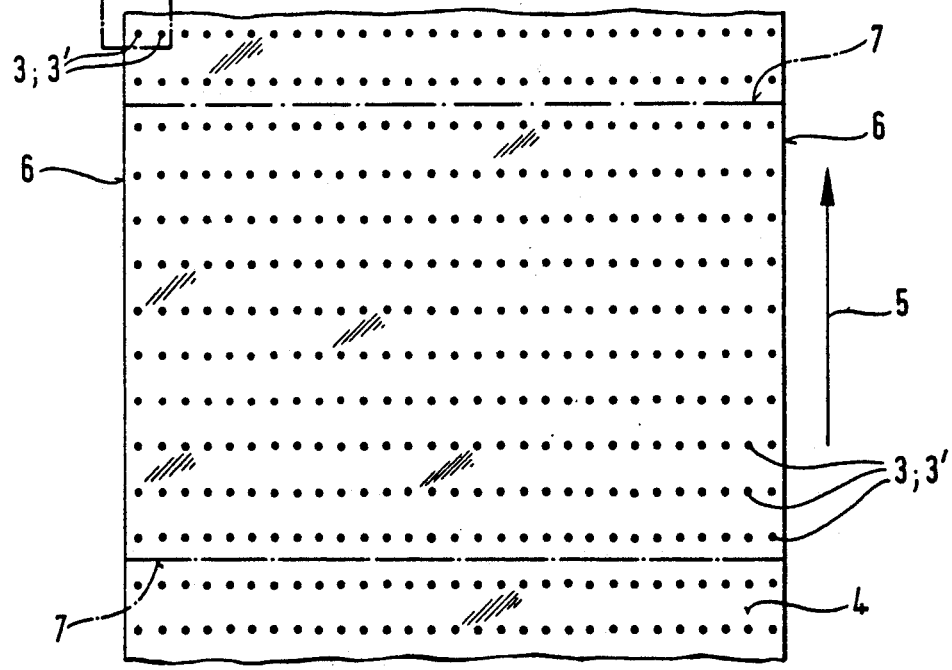

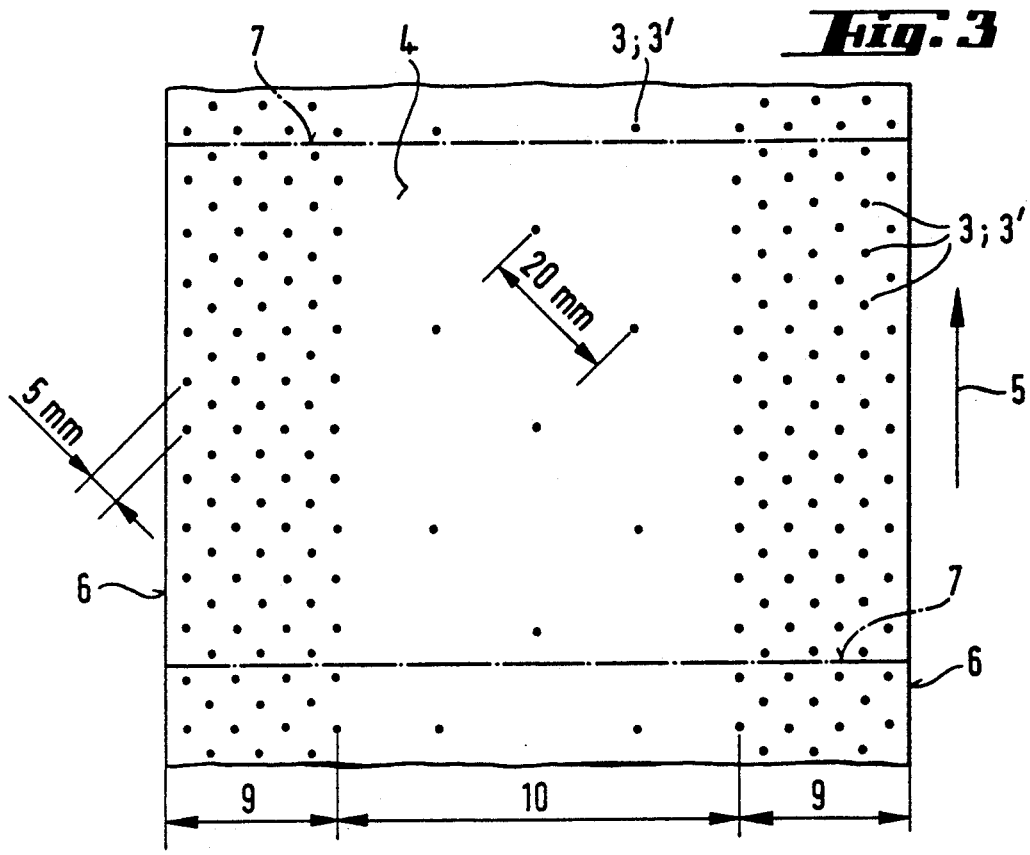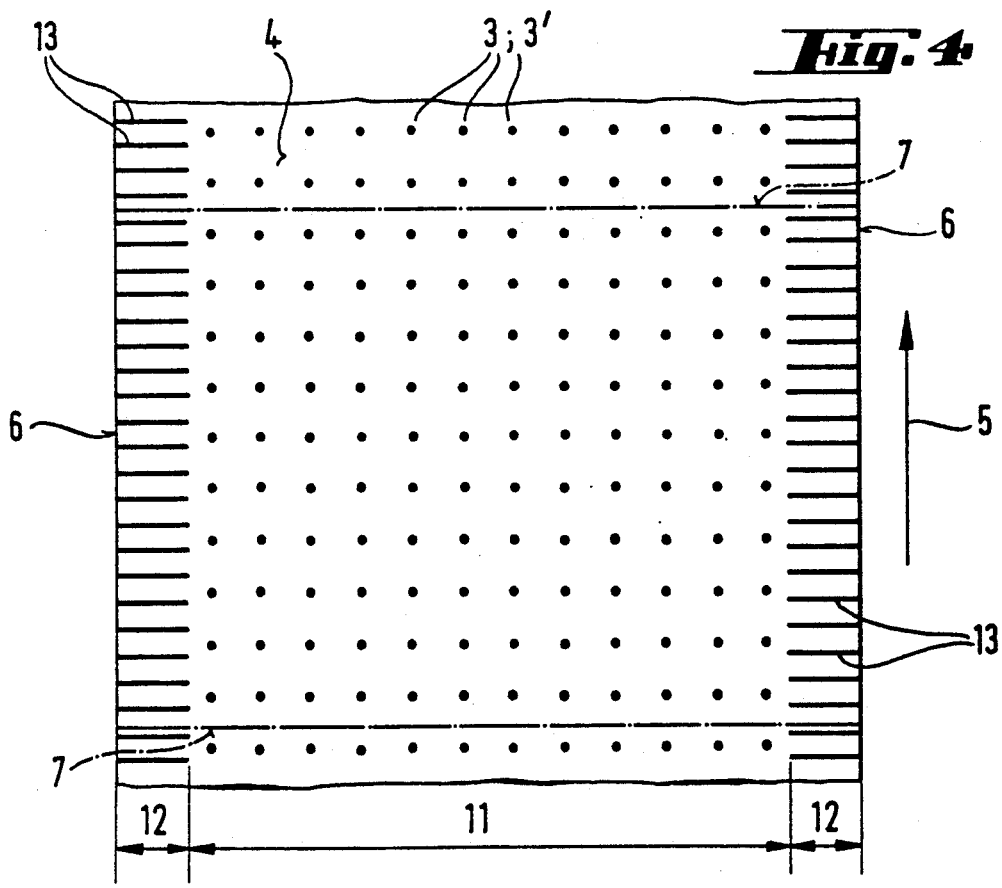

METHOD FOR MAKING A COMPOUND FOIL

PRIOR APPLICATION

This application is a continuation of U.S. patent application Ser. No. 143,161 filed Jan. 21, 1988, now abandoned.

TECHNICAL FIELD

The invention relates to compound foil produced as endless strip and to be processed in the form of blanks for packaging, respectively its advantageous application.

STATE OF THE ART

Blanks of packaging foil are used in packaging technology in particular for producing wrapping packagings with a packaging foil strip—most frequently pulled off the roll during the packaging process—being divided into blanks, which then serve to fold in or wrap in the item to be packaged in the packaging machine.

If such packaging foil in the form of a compound material is made up of several layers, in the manufacture of the compound foil produced as endless strip, most frequently two foil strips, each of which may already consist of a partial compound, are connected through lamination. In the process, the two foil strips are each pulled with such tractive force through the lamination machine, that the friction losses are overcome. The two foil strips are connected with each other while being subjected to a not inconsiderable tractive force and in many cases are stretched to different elastic extends. After cessation of the tractive force, the foil strips also shrink to a different degree, which leads to a tendency of the compound foil to roll up around an axis transverse to the longitudinal extension of the endless strip, with the particular result that the compound foil blanks no longer lie flat on a planar surface. Such compound foil blank then can not—or only when special measures are applied—be transported further in the packaging machine and/or be shaped into a package according to the originial intend.

It is, however, also possible that a tendency of the compound foil to roll up occurs around an axis parallel to the endless strip extension. This, for example, is the case, if one of the two foil strips consists to a substantial extend of a material of paper, the fibers of which—in the process of the compound foil production—by taking up or giving off moisture change with respect to their dimensions and in this way cause expansion or shrinking of this paper foil strip transversely to its longitudinal extension.

A particular kind of folding packaging is the so-called twist packaging for relatively small items to be packaged, like candy. To produce twist packages, the candy, for example, is folded in the packaging machine into the packaging material blank so, that this forms a wrapper referred to as tubus, the projecting ends of which are then twisted. A known twist packaging material for candy of somewhat higher quality consists, for example, of a 20-23 $\mu$m strong viscose foil, which is metallized on one side and provided with a decorative print. Twist packages, prepared from such viscose foil, have the property that—due to the limited resetting forces of the viscose material—the twisted ends of the twist package later to not untwist or only to a very slight extent. Instead of viscose foil special papers can also be used for such twist packages. Advantageously, two-strip twist packaging is also used, which consists, for example, of an aluminum foil of smaller width and a thickness of 8-12 $\mu$m on the side of the item to be wrapped and a printed wider synthetic material strip arranged loosely around it. The areas of the synthetic foil projecting on both sides beyond the aluminum foil are then twisted. A compound foil, for example, consisting of a synthetic foil sheet-lined over its entire surface with an aluminum foil could possibly serve, for example, as packaging material for twist packagings; due to the tendency to roll up explained further up, they are suitable for such application in twist packaging machines only to a limited extend.

The invention is first based on the task of indicating a compound foil manufactured as endless strip, produced of two different foil strips, the blanks of which, however, in spite of it, show no tendency to roll.

The task, on which the invention is based, is solved by the compound foil according to the invention, which is characterized in that it consists of two different foil strips, of which at least one contains an aluminum foil or a paper and which possibly itself is composed of several different layers with these foil strips only beng connected with each other through one connecting surface, which possibly consists of several partial regions separated from each other, and with the not interrupted dimensions of the connecting surface determined in the direction parallel and perpendicular to the endless strip extensions being small in comparison to the endless strip width. The—in each instance—other of the foil strips can, here, advantageously consist at least largely of biaxially stretched polypropylene or of viscose.

The partial areas in an advantageous development of the compound foil according to the invention, the partial areas of the connecting surface separated from each other are distributed over at least nearly the entire endless strip surface.

According to a further advantageous model of the invention, the compound foil according to the invention is characterized in that the connecting surface makes up at most 50% but advantageously at most 5% of the endless strip surface.

According to another advantageous model of the compound foil according to the invention, the latter is characterized in that the surfaces of the future blanks have each one central area and margin area bordering on the blank surface margin, which are possibly provided at the blank margins extending in the endless strip extension, and in these margin areas the proportion of the connecting surface at the margin area surface is significantly greater than the proportion of the connecting surface within the central area at the central area surface. In these margin areas the proportion of the connecting area partial areas at the margin area surface makes up preferentially at least the five-fold, advantageously, however, at least the ten-fold of the proportion of the connecting area partial areas at the central area surface existing within the central region or, it is also conceivable, that the two foil stips in the central region are advantageously not connected with each other.

According to advantageous developments of the invention, the compound foil according to the invention is characterized in that in the mentioned margin areas the connecting surface proportion at the margin area surface is at most 75% and/or that it has margin areas, the average widths of which are each at least 10 mm.

In a further advantageous design of the invention, the compound foil according to the invention is characterized in that the central area of the blank surface has dimensions that when the compound foil blank is used for solid piece packaging items this central area is suitable to cover in the package at least the major part of the surface or a surface side of the packaged item.

The invention relates further to advantageous applications of the compound foil according to the invention. According to one of these applications according to the invention, blanks of the compound foil according to the invention are used for the manufacture of folding or wrapping packagings, but preferentially also for the manufacture of twist packagings. According to another application according to the invention, blanks of the packaging foil according to the invention are used as labels.

BRIEF DESCRIPTION OF THE FIGURES

FIG. 1 shows schematicalley the structure of a compound foil in cross section, which is intended to be used in the form of blanks for the manufacture of twist packagings with the individual compound foil layers-for the sake of greater clarity—being shown exaggeratedly thick.

FIG. 2 shows in cross section along plane II—II of FIG. 1 a segment of the compound foil produced as endless strip om a scale of approximately 1:1; left a partial magnification on a scale of 10:1 is shown.

In FIG. 3 along section II—II a segment of the compound foil according to another variant of the invention is shown.

FIG. 4 represents, also corresponding to the section along II—II, a segment of a variant of the endless strip according to FIG. 3.

The compound foil shown in FIG. 1 in cross section consists, according to an advantageous example, of a 15-30 $\mu$m thick foil 1 of biaxially stretched polypropylene (OPP), which is provided on its back 2 with a decorative print, that is with a so-called reverse print, and is connected within a connecting surface consisting of circular partial areas 3 with 7 $\mu$m thick aluminum foil 4 by lamination. Instead of aluminum foil a paper, for example, having an area weight of 95 g-m$^2$ can also advantageously be used.

The areas of the blanks, which later are intended to be used as packaging material for twist packagings, for example, for candy, are, as shown in FIG. 2, defined by the two margins 6 extending in direction 5 of the endless strip extension of the compound foil and by imaginary lines 7 extending perpendicularly to it. FIG. 2 shows further the arrangement of the circular connecting surface partial areas 3, which have a diameter of approximately 1 mm and are arranged along a rectangular raster. The surface proportion of the partial areas 3 on the entire endless strip surface makes up approximately 3.2%.

To manufacture the compound foil, the aluminum foil 4 supplied as endless strip is—within the circular partial areas 3—provided in a laminating machine, according to the pattern shown in FIG. 2, with a binding agent application 3' (see FIG. 1), for example, on polyurethane base and sheet-lined with the printed OPP foil 1 also prepared as endless strip. At the moment the two endless strips are connected, the OPP foil 1—due to the tension applied in the laminating machine—because of its lesser E—module is more strongly stretched than the aluminum foil 4, so that—when after completed lamination the two foils resume their original starting state again—the OPP foil 1 shrinks to a greater extent than the aluminum foil 4. This then has the effect, that outside the partial areas 3 the aluminum foil 4 in the form of very flat bubbles 8, which in FIG. 1 for greater clarity have been shown overly high, separates from the OPP foil 1. Blanks produced from this compound foil have no tendency to roll themselves up.

The laminated partial areas can have the most diverse shapes. However, it is important, that at least over the major part of the endless strip width the continuous lengths of the partial areas, determined parallel and perpendicular to the endless strip extension, are in each instance small in relation to the endless strip width. The "tension effect" caused by the differential shrinking and the tendency of the compound foil to roll are then largely avoided.

In the variant according to FIG. 3, the blank area bounded by the margins 6 of the endless strip and the imaginary lines 7 extending perpendicularly to them, comprises three strip-shaped areas extending in direction 5, in particular two marginal areas 9 adjoining the margins 6 and a central area 10 lying between them. The circular connecting surface partial areas 3, which have a diameter of approximately 1 mm, are arranged along square rasters, with the raster division in the two marginal areas being 5 mm and in the central area 20 mm. This results in that in the two marginal areas 9 the portion of the laminated partial areas 3 at the marginal area surface is the 16-fold of the proportion of the partial areas 3 of the central area surface provided in the central area 10. The blanks prepared from this endless strip have, in particular when used as packaging material of a twist package, the following advantages. On the one hand, the greater density of the laminated partial areas 3 in the two margin areas 9, in which in the future twist package the twisted blank margins come to lie, is sufficient to prevent delamination of the blanks in the blank margins 6, while, on the other hand, the central area 10, which—when used as twist packaging—covers the candy completely and with overlapp up to the places at which the twisted ends start, has practically a smooth surface, which increases the aesthetic appearance of the package. This is particularly also the case, if, according to one variant (not shown in the figures) of the compound foil, the two foil strips are in their central area not connected with each other at all.

It has further been found, that it is advantageous if the average width of the margin areas 9 is at least 10 mm. It has, additionally, been shown, that if in the margin areas the proportion of the connecting surfaces partial areas of the margin area surface becomes too high, the surface of the foil forming the flat bubbles 8, for example, the aluminum foil according to FIG. 1, acquires an unattractive wrinkled appearance. For this reason, this fraction is many cases amounts to advantageously at most 75%.

In the variant of the endless strip according to FIG. 4 in a central area 11 circular connecting surface partial areas 3 and in the two margin areas 12 linear connecting surface partial areas 13 extending perpendicularly to direction 5 of the endless strip longitudinal extension are provided. This specific kind of partial lamination has the advantage that in the margin areas a potential bending of the blank around a line extending parallel or obliquely to direction 5 and, hence, an unwanted formation of folds of the material need hardly be feared. Such bending takes place, primarily along straight lines of strips of the blank surface, which are free of connecting material parallel areas 8 respectively 3. Through this manner of laminating folding perpendicular to the endless strip extension is facilitated, by which production of the foil tube, which takes place before the actual twisting process, is advantageously supported.

INDUSTRIAL EXPLOITATION

Besides for twist packaging, blanks of the compound foil according to the invention can generally also be used advantageously for packaging material for folding or wrapping packaging. In another advantageous application such blanks can be used as labels, as are placed, for example, on bottles.

We claim:

1. Method for the production of a compound foil as an endless strip, the compound foil to be processed in the form of rectangular blanks covering a width of the endless strip characterized in that two different foil strips, of which a first strip contains an aluminum foil (4) or a paper and which itself optionally is structured of several different layers are drawn through a lamination machine with tractive forces to overcome friction losses in the machine, these tractive forces producing different elongations in said two different foil strips, that one of the endless strips is provided at one side surface with a binding agent over a connecting surface, which consists of several partial areas (3, 13) separated from each other, that the two strips are connected to each other while the both strips being elastically stretched to different elongations as the strips are drawn through the lamination machine whereby after the two foil strips coming back again to their non-stretched starting state, that foil strip having been stretched to the lower elongation forming bubbles in the produced compound foil, that surfaces of the blanks each have one central area and two margin area (9, 12) bordering on two blanks surface margins extending both in the endless strip extension, with, in each instance, in those margin areas (9, 12) a first proportion defined by the connecting surface area divided by the margin area surface being significantly greater than a second proportion defined by the connecting surface at the central area divided by the central area surface and that in the margin areas (9, 12) of the blank surface the said first proportion is at most 75%.

2. The method of claim 1, characterized in that the connecting surface makes up at most 5% of the endless strip surface.

3. The method of claim 1, characterized by margin areas (9, 12) of the blank surface, in which, in each instance the said first proportion amounts to at least the ten fold of the said second proportion.

4. The method of claim 1 characterized in that a second foil strip consists of biaxilly stretched polypropylene or of viscose.

5. The method of claim 1 characterized in that the partial areas (3, 13) of the connecting surface separated from each other are distributed over the entire endless strip surface.

6. The method of claim 1 characterized in that the connecting surface makes up at most 50% of the endless strip surface.

7. The method of claim 1 characterized by margin areas (9, 12) of the blank surface, in which, in each instance, the said first proportion amounts to at least the five-fold, proportion.

8. The method of claim 7 characterized in that the two foil strips are not connected with each other in their central area.

9. The method of claim 1 characterized by margin areas (9, 12) of the blank surface, an average widths of each are at least 10 mm.

10. The method of claim 1 characterized in that the central area (10, 11) of the blank surface has a width such that when the compound foil blank is used for solid piece packaging items, this central area (10, 11) is suitable for covering in the package at least the major part of the surface or one surface side of the packaged item.

* * * * *